United States Patent
Bakker (12)

(10) Patent No.: US 10,331,986 B2
(45) Date of Patent: Jun. 25, 2019

(54) ROLL-FED PRINTING APPARATUS, SOFTWARE MEDIUM, AND METHOD FOR CONTROLLING A ROLL-FED PRINTING APPARATUS

(71) Applicant: Océ Holding B.V., Venlo (NL)

(72) Inventor: Ruben Bakker, Venlo (NL)

(73) Assignee: OCÉ HOLDING B.V., Venlo (NL)

( * ) Notice: Subject to any disclaimer, the term of this patent is extended or adjusted under 35 U.S.C. 154(b) by 0 days.

(21) Appl. No.: 16/018,742

(22) Filed: Jun. 26, 2018

(65) Prior Publication Data

US 2018/0373968 A1  Dec. 27, 2018

(30) Foreign Application Priority Data

Jun. 27, 2017  (EP) ..................................... 17177988

(51) Int. Cl.
  *G06K 15/00*  (2006.01)
  *G06K 15/02*  (2006.01)
  (Continued)

(52) U.S. Cl.
  CPC ......... *G06K 15/1817* (2013.01); *B41J 11/002* (2013.01); *B41J 25/006* (2013.01);
  (Continued)

(58) Field of Classification Search
  CPC ............. G06K 15/1817; H04N 1/0009; H04N 1/00053; H04N 1/00665; B41J 11/002; B41J 25/006
  (Continued)

(56) References Cited

U.S. PATENT DOCUMENTS 8,565,552 B2  10/2013  Sommer et al.
2003/0193533 A1  10/2003  Kikuta et al.
(Continued)

FOREIGN PATENT DOCUMENTS

| EP | 3 093 753 A1 | 11/2016 |
|---|---|---|
| JP | 9-11455 A | 1/1997 |
| WO | WO 2014/048734 A1 | 4/2014 |

OTHER PUBLICATIONS

European Search Report issued in EP 17 17 7988, dated Dec. 18, 2017.

*Primary Examiner* — Neil R McLean
(74) *Attorney, Agent, or Firm* — Birch, Stewart, Kolasch & Birch, LLP (57) ABSTRACT

A roll-fed printing apparatus for printing at least a first and a second image on a recording medium, a method for controlling such a printing apparatus and a software medium are disclosed. According to the method, each swath is printed by a print head that reciprocates in a scanning direction, the print head being controlled to apply marking material to the recording medium in accordance with a first set of image lines for each swath to be printed; the first set of image lines being provided to the print head from a swath buffer; wherein the first set of image lines are transmitted to the swath buffer out of a second set of image lines stored in a line buffer to be printed without interruption; wherein, when the line buffer comprises the final image lines of a first bitmap representing the first image while there are still empty data storage sections within the line buffer starting image lines of a second bitmap representing the second image are transferred to the empty data storage section of the line buffer.

15 Claims, 2 Drawing Sheets

(51) Int. Cl.
*B41J 11/00* (2006.01)
*B41J 25/00* (2006.01)
*H04N 1/00* (2006.01)

(52) U.S. Cl.
CPC ......... *G06K 15/022* (2013.01); *H04N 1/0009* (2013.01); *H04N 1/00053* (2013.01); *H04N 1/00665* (2013.01)

(58) Field of Classification Search
USPC ....................................................... 358/1.13
See application file for complete search history.

(56) References Cited

U.S. PATENT DOCUMENTS

| | | | |
|---|---|---|---|
| 2005/0190393 A1* | 9/2005 | Bledsoe ................... | G06F 8/65 358/1.13 |
| 2006/0140498 A1* | 6/2006 | Kudo ........................ | G06T 1/60 382/254 |
| 2006/0232623 A1* | 10/2006 | Murcia .................. | B41J 25/308 347/20 |
| 2012/0250087 A1 | 10/2012 | Muta | |
| 2013/0113868 A1* | 5/2013 | Veis ..................... | B41J 11/0015 347/102 |
| 2015/0183234 A1* | 7/2015 | Cluff .................... | B41M 7/0045 347/102 |
| 2016/0335035 A1* | 11/2016 | Uchida ................. | G06F 3/1211 |

\* cited by examiner

ROLL-FED PRINTING APPARATUS, SOFTWARE MEDIUM, AND METHOD FOR CONTROLLING A ROLL-FED PRINTING APPARATUS

CROSS-REFERENCE TO RELATED APPLICATIONS

This application claims priority to European Patent Application No. 17177988.7, filed on Jun. 27, 2017, the entirety of which is expressly incorporated herein by reference.

BACKGROUND OF THE INVENTION

1. Field of the Invention

The present invention generally pertains to a printing apparatus, such as a roll-to-roll inkjet printing apparatus, for printing images on a recording medium such as paper. The invention also pertains to a software medium comprising executable code configured to, when executed, perform a method for controlling a printing apparatus. The invention further pertains to a method for controlling a printing apparatus, such as a roll-to-roll inkjet printing apparatus, for printing images on a recording medium such as paper.

2. Description of the Related Art

Roll-fed printers are a well-known type of printers. In roll-fed printers, a recording medium such as paper is wound up on an input roll and then fed into, and guided along, a path through the printer, unwinding the input roll by and by along the process. In this way, the recording medium is roll-fed (i.e. taken from a roll and fed) to a marking unit of the printer which applies a marking material (i.e., prints) onto the recording medium Roll-to-roll printers are a common sub-type of roll-fed printers and are characterized in that the recording medium is, after images have been printed on it, wound up on an output holder of an output roll by and by along the process.

Roll-fed printers are very efficient devices for printing a large number of images requiring a large amount of the recording medium, as the wound-up input rolls are comparatively easy to handle by both the printers and their operating personnel. Accordingly, little or no supervision by personnel is needed for roll-fed printers, especially for roll-to-roll printers, as the printed recording medium is automatically stored on the output roll.

Efficient use of time is one of the main goals when developing roll-fed printers and methods for controlling roll-fed printers. In the prior art, some time is always lost when a first image has finished printing, and a second image is about to be printed. In roll-fed printers of the prior art, a buffer for image lines of bitmaps to be printed by the marking unit contains image lines only from a first bitmap representing the first image as long as the first image is not yet finished. While the first image is being finished, the marking unit, e.g. a print head of an inkjet printing apparatus, is used only for finishing the first image. Only when the first image has been finished, image lines of a second bitmap representing the second image are loaded into the buffer, and then the marking unit starts printing the second image.

The time loss accrued by this may even be greater when the roll-fed printer is an inkjet printer using UV curable ink, as explained in the following.

The term "UV", or "UV radiation", as used herein, refers to "ultraviolet" electromagnetic radiation, or light, which generally has a wavelength from 10 nm (ten nanometers) to 400 nm (four hundred nanometers), shorter than that of visible light but longer than that of X-rays.

UV curable ink is a type of ink that is cured (which comprises, but does not simply consist of, drying) by being subjected to UV radiation of specific wavelengths that may vary from ink to ink. UV curable inks typically contain reactive monomers, photo initiators, oligomers, pigments, and additives that, when introduced to an UV-radiation-emitting unit (or "UV lamp" for short) such as a UV arc lamp or a UV light emitting diode (UV-LED), create a rigid film. The reactive monomers contained in the UV curable ink crosslink to provide a cured, cross-linked coating on the recording medium. In other words, images may be formed by applying UV curable ink to a recording medium and curing the UV curable ink subsequently.

UV curable inks are usable on a wide range of substrates from metals, glass, and ceramics to flexible packaging, thin-gauge polymeric films, and more. The advantages of UV curable inks include good print quality, adhesion, scratch resistance, light fastness and color density.

The curing of the UV curable ink usually has to be performed in a regular step cadence, i.e. steadily, without sections being irradiated with UV radiation longer than others (which might cause the recording medium to deform or deteriorate) and without sections containing UV curable ink being skipped by the curing UV lamp. As the UV lamps are usually controlled according to the information in the buffer, this means that not only the first image has to be finished, but also the curing of the first image by the UV lamp has to be finished before the printing of the second image may be started.

When, as is also common, the UV lamp is arranged at a set distance from the UV ink ejecting print head, said print head might have to be moved considerably along the recording medium in order for the UV lamp to be able to cure the last printed image lines of the first image. Then, in particular when a narrow distance between the printed first image and the printed second image on the recording medium is desired (e.g. to save recording medium), it may be necessary for the print head to backtrack in a time-consuming way, or to move the recording medium in a direction opposite to the usual media transport direction, away from the input roll. In addition to being time-consuming, such a reversing of the transport direction is challenging for all components of the roll-fed printer.

U.S. Pat. No. 8,565,552 B2 describes a method of assembling multiple medical images into a single image, according to which a large bitmap, or virtual canvas, comprising a number of originally individual images of one and the same person is created by concatenation and is then printed in the usual manner. The individual images must be prepared with special border sections to achieve a matching concatenation. For roll-fed printers, this method is not feasible since the individual images to be printed by roll-fed printers are not parts of a single, large image broken down into several, but may be completely independent and unrelated.

It is desirable to have a method for controlling a roll-fed printing apparatus that makes optimum use of the available resources when printing two or more images one after the other and that solves, or ameliorates, the above-described issues. It is also desirable to have a roll-fed printing apparatus capable of executing such a method, and to have a software medium with which such a method may be introduced to an existing printing apparatus.

SUMMARY OF THE INVENTION

In a first aspect of the present invention, a method for operating a printing apparatus for printing at least a first and a second image on a recording medium in a plurality of swaths is provided, wherein each swath is being printed by a print head that reciprocates in a scanning direction, the print head being configured to apply marking material to the recording medium in accordance with a first set of image lines for each swath to be printed, the first set of image lines being provided to the print head from a swath buffer; wherein the first set of image lines are transmitted to the swath buffer out of a second set of image lines stored in a line buffer, wherein the second set of image lines in the line buffer is to be printed without interruption; wherein the line buffer is fed with image lines of a first bitmap representing the first image and thereafter with image lines of a second bitmap representing the second image; wherein, when the line buffer comprises the final image lines of the first bitmap while there are still empty data storage sections within the line buffer, and when it is not indicated, by a pausing signal, that the printing of the second image should be halted, then starting image lines of the second bitmap are transferred to the empty data storage section of the line buffer.

It should be understood that, although the invention is described with respect to a first and a second image, the second image may be treated (regarding a subsequent third image) in the same way as the first image has been treated (regarding the second image), and so on. In other words, the steps described herein for a "first" and a "second" image (or "print job") may be performed, in turn, for every two images queued for the roll-fed printing apparatus. For example, when images A, B and C are queued, in that order, the method may be performed with image A as the "first image" and image B as the "second image" but additionally and equally with image B as the "first image" and image C as the "second image, and so on. The term "first image" could accordingly be replaced by "earlier image of a queue" and the term and "second image" could accordingly be replace by "immediately subsequent image in the queue", as "first image" does not mean that that image must necessarily be at the very front of the queue.

Advantageously, the second bitmap may be received, or even be generated, as the first bitmap is already being printed, or, in other words, after the printing of the first bitmap has already started. In this way, a number of individual images to be printed may be "daisy-chained"—it is not necessary to create first one large bitmap comprising all of the individual images to be printed.

The term "printing" is used herein as a general term for any marking of a recording medium with any marking material. As a synonym, the term "image forming" may be used. Recording mediums may comprise paper, flexible plastic, metal foils, textiles and so on. Marking materials may comprise ink, metal, varnish, toner and so on. "Marking" may be any process by which the marking material is applied to the recording medium.

The printing apparatus is, in preferred embodiments, a roll-fed or a roll-to-roll printing apparatus and/or an inkjet printing apparatus, in particular a UV curable ink printing apparatus. In an especially preferred embodiment, the printing apparatus is a roll-to-roll UV curable ink printing apparatus.

The solution according to the first aspect allows the printing apparatus to commence printing of the second image even while the last image lines of the first image are still being printed within the same print swath, or while image lines of the first image are still being cured by a UV lamp.

In a second aspect of the invention, a software medium comprising executable code is provided, wherein the executable code is configured to, when executed, perform a method according to the first aspect.

In a third aspect of the invention, a roll-fed printing apparatus for printing at least a first and a second image on a recording medium in a plurality of swaths is provided. The roll-fed printing apparatus comprises: a print head configured to reciprocate in a scanning direction; wherein the print head is further configured to apply marking material to the recording medium in accordance with a first set of image lines for each swath to be printed; an image storage module configured to receive and store a first bitmap representing the first image and a second bitmap representing the second image; a line buffer; a swath buffer; and a printer controller; wherein the printer controller is configured to perform a method according to the first aspect of the invention.

Additional advantages, and the solution of additional problems, will be apparent from the subject-matter of the dependent claims as well as from the description and the drawings.

In some advantageous embodiments, the starting image lines of the second bitmap are transferred to the empty data storage sections such as to be directly adjacent to the final image lines of the first bitmap. In other words, the starting image lines of the second bitmap are transferred to the empty data storage sections such that the image lines printed on the recording medium based on those starting image lines are directly adjacent to the image lines printed on the recording medium based on those final image lines of the first bitmap.

In some advantageous embodiments it is provided that, whenever starting image lines of the second bitmap are to be transferred to the empty data storage sections of the line buffer, first a number of boundary image lines representing a boundary area on the recording medium between the first and the second image to be printed are transferred to the line buffer such as to be directly adjacent to the final image lines of the first bitmap, and then starting image lines of the second bitmap are then transferred to the line buffer such as to be directly adjacent to the boundary image lines.

Boundary areas may be advantageously used e.g. for cutting the recording medium to separate the individual printed images. The number of boundary image lines, each of fixed height, (or, equivalently, the total length of the boundary area along the length of the recording medium in the transport direction of the medium), may be set dynamically by a user input, e.g. into a user interface (UI) of the roll-fed printing apparatus. The height of the boundary image lines and the length of the boundary may also be set to zero by the user, for example when the first and the second image are actually part of one large image that is to be printed contiguously.

In some advantageous embodiments it is provided that, when the starting image lines of the second bitmap are transferred to the empty data storage section of the line buffer, either:

a) as many of the starting image lines of the second bitmap are transferred as are needed to fill the empty data storage sections of the line buffer, or b) as many of the starting image lines of the second bitmap are transferred as remain of the second bitmap, whichever number of image lines (either according to a) or according to b)) is smaller.

In some advantageous embodiments it is provided that, when fewer image lines of the second bitmap are transferred as are needed to fill the line buffer, starting image lines from a third bitmap representing a third image are transferred to the empty data storage section of the line buffer, provided that it is not indicated, by the pausing signal, that the printing of the third image should be halted.

In some advantageous embodiments, the starting image lines from the third bitmap are transferred to the empty data storage sections of the line buffer such as to be directly adjacent to the image lines of the second bitmap stored therein.

In some advantageous embodiments, whenever starting image lines of the third bitmap are to be transferred to the empty data storage sections of the line buffer, first a number of boundary image lines representing a boundary area on the recording medium between the second and the third image to be printed are transferred to the line buffer such as to be directly adjacent to the image lines of the second bitmap, and then starting image lines of the third bitmap are transferred to the line buffer such as to be directly adjacent to the boundary image lines. Also in these embodiments, the number of boundary image lines may be set dynamically by a user input, e.g. into the user interface (UI) of the roll-fed printing apparatus.

In some advantageous embodiments, when the number of final image lines of the first bitmap contained in the line buffer is smaller than the number of image lines required for the first set of image lines, then the first set of image lines which is transmitted to the swath buffer, is formed as comprising those final image lines of the first bitmap as well as image lines of the starting image lines of the second bitmap.

In some advantageous embodiments, when the pausing signal indicates that the printing of the second image should be halted, the transferring of the starting image lines from the second bitmap to the line buffer is delayed or halted. In this way, the first image may be completely printed, and no marking material or recording medium is lost. By contrast, if a common line buffer for some reason comprise image lines from both a first and a second image, and a signal to abort the printing is received, then either the printing is continued until the line buffer is empty, or printing is halted immediately, regardless of whether the first image has been finished or not.

In some advantageous embodiments, when the pausing signal, after having indicated that the printing of the second image should be halted, is changed to indicate that the printing of the second image should no longer be halted, the starting image lines of the second bitmap representing the second image are transferred to the empty data storage section of the line buffer. Then, printing may be continued as usual with transferring the necessary number of image lines for the first set of image lines from the line buffer to the swath buffer.

In some advantageous embodiments, the pausing signal is an automatically generated pausing signal in response to a detected abnormality in the roll-fed printing apparatus. Additionally, or alternatively, the pausing signal may be generated by a user input, e.g. by pressing a "pause" button of a UI.

In some advantageous embodiments, the printing apparatus being controlled is a UV curing printing apparatus comprising a UV curing lamp and the UV curing lamp is controlled to start or continue curing of UV curable ink already applied to the recording medium when the print head is applying UV curable ink to the recording medium in accordance with the first set of image lines in the swath buffer, even when the first set of image lines in the swath buffer comprises both image lines from the first bitmap and the second bitmap and/or even when the first set of image lines consists of image lines only from the second bitmap.

Similarly, in some advantageous embodiments of the third aspect, the printing apparatus is a UV curing printing apparatus comprising a UV curing lamp and the printer controller is configured to control the UV curing lamp to start or continue curing of UV curable ink already applied to the recording medium when the print head is applying UV curable ink to the recording medium in accordance with the first set of image lines in the swath buffer, even when the first set of image lines in the swath buffer comprises both image lines from the first bitmap and the second bitmap and/or even when the first set of image lines consists of image lines only from the second bitmap.

BRIEF DESCRIPTION OF THE DRAWINGS

The present invention will become more fully understood from the detailed description given hereinbelow and the accompanying schematic drawings which are given by way of illustration only, and thus are not limitative of the present invention, and wherein.

DETAILED DESCRIPTION OF EMBODIMENTS

The present invention will now be described with reference to the accompanying drawings, wherein the same reference numerals have been used to identify the same or similar elements throughout the several views, and in some instances throughout the several embodiments.

Figure 1:
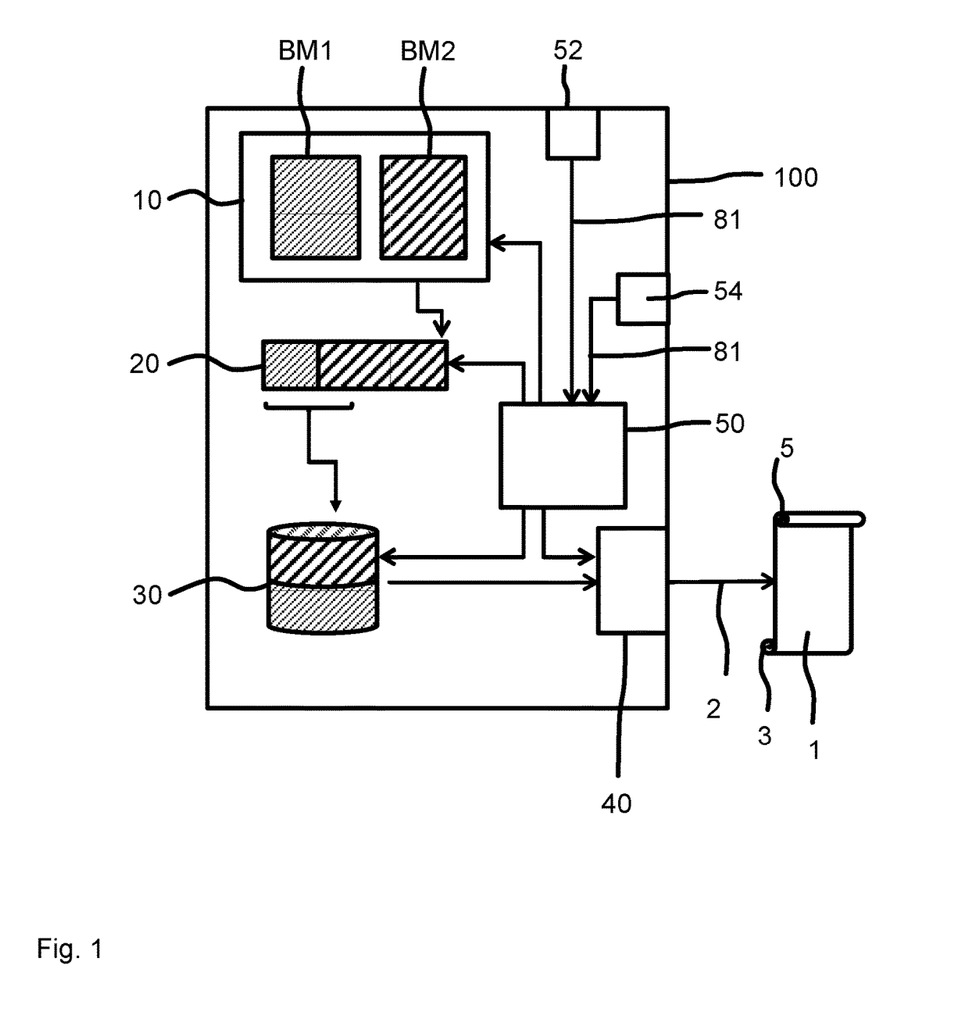
FIG. 1 schematically shows a representation of a roll-fed printing apparatus according to an embodiment of the third aspect.

FIG. 1 schematically shows a representation of a roll-fed printing apparatus 100 according to an embodiment of the third aspect. With reference to FIG. 1, also a method according to an embodiment of the first aspect will be described. It should be understood that the method according to the first aspect is usable with the roll-fed printing apparatus 100 according to the third aspect and vice versa. The method may be modified or adapted according to all variations and modifications described with respect to the roll-fed printing apparatus 100 according to the first aspect and vice versa.

The roll-fed printing apparatus 100 is configured for printing at least a first and a second image on a recording medium 1 in a plurality of swaths. Preferably, the roll-fed printing apparatus 100 is a roll-to-roll inkjet printing apparatus; however, the advantageous ideas and concepts described herein are equally applicable to other roll-fed printing apparatuses.

As indicated in FIG. 1, the roll-fed printing apparatus 100 comprises a print head 40 configured to reciprocate in a scanning direction. The print head 40 is further configured to apply marking material 2 to the recording medium 1 in accordance with a first set of image lines for each swath to be printed. "First" in this case is a designation and not an indication that these image lines are the first in time, or the first at a location. The print head 40 is e.g. an inkjet print head.

The roll-fed printing apparatus 100 further comprises an image storage module 10 configured to receive and store a first bitmap BM1 representing the first image and a second bitmap representing the second image BM2. The image storage module 10 may also be called a bitmap storage module 10. By a bitmap representing an image it is meant in particular that the bitmap ((i.e. a raster image comprising pixels arranged in image lines) may have been created by rasterizing original data of that image. The original data may e.g. have been in a vector graphics format.

Accordingly, the method according to the first aspect may comprise the steps of: receiving a first image to print; receiving a second image to print; generating a first bitmap BM1 representing the first image; generating a second bitmap BM2 representing the second image; storing the first image in the image storage module 10; storing the second image in the image storage module 10. The steps of generating the first and the second bitmap BM1, BM2 may be performed by a raster image processor, RIP, which may or may not be part of the roll-fed printing apparatus 100.

The roll-fed printing apparatus 100 also comprises a line buffer 20, a swath buffer 30 and a printer controller 50.

The roll-fed printing apparatus 100 is configured to perform the method described in the following and in the foregoing, wherein in particular the printer controller 50 is configured to perform the necessary steps, including some or all of the steps for creating and storing the bitmaps BM1, BM2 set out above.

The print head 40 of the roll-fed printing apparatus 100 reciprocates in a scanning direction, i.e. in a direction perpendicular to a media transport direction which is directed from an input roll 3 of the roll-fed printing apparatus 100 to an output section 5 of the roll-fed printing apparatus 100 (an output roll in the case of a roll-to-roll printing apparatus). Preferably, the print head 40 is configured to print a swath at each leg of the reciprocating movement along the scanning direction; however, the print head 40 may alternatively also be configured to print only when passing the recording medium 1 in one direction.

Figure 2:
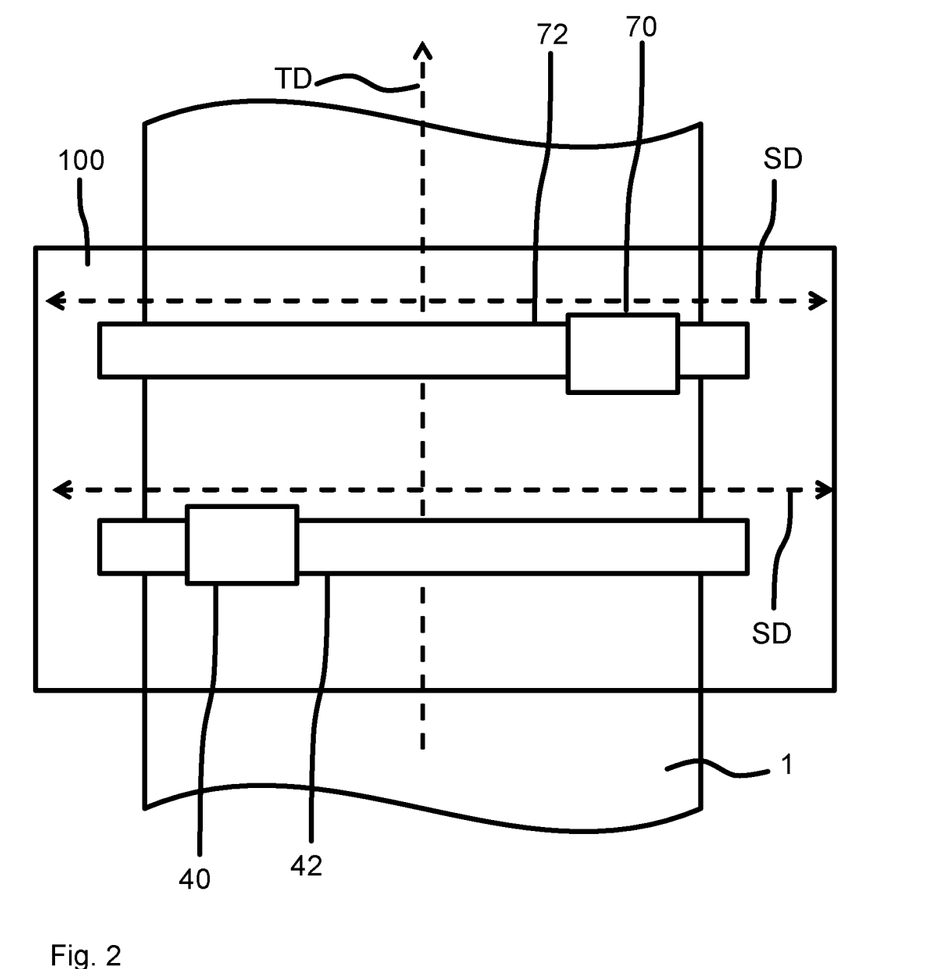
FIG. 2 schematically shows a representation of a roll-fed printing apparatus according to another embodiment of the third aspect.

When explaining the function of the roll-fed printing apparatus 100 in detail, occasionally reference will also be made to reference signs shown in FIG. 2.

FIG. 2 shows a variant of the roll-fed printing apparatus 100 of FIG. 1, in which the roll-fed printing apparatus 100 is a UV curable ink printing apparatus comprising a UV lamp 70 configured to cure, in curing swaths 72, the UV curable ink applied to the recording medium 1. The UV lamp 70 moves in reciprocation in a scanning direction SD along an axis which is arranged in parallel, at a fixed distance, to the movement axis along which the print head 40 moves in the scanning direction SD. The remarks and explanations made about the embodiment of FIG. 1 also apply, unless explicitly stated otherwise, equally to the embodiment shown in FIG. 2. Particular features of the embodiment of FIG. 2 will be explained in more detail in the following.

The print head 40 is configured to apply marking material 2 (e.g. UV curable ink) to the recording medium 1 in accordance with a first set of image lines for each swath 42 to be printed. The first set of image lines is provided to the print head 40 from the swath buffer 30. The swath buffer 30 stores exactly as many image lines of a bitmap as the print head 40 is capable of printing in one swath 42. By contrast, the line buffer 20 will typically be capable of storing more image lines of a bitmap BM1, BM2 than the swath buffer 30.

The first set of image lines are transmitted to the swath buffer 30 out of a second set of image lines stored in the line buffer 20 to be printed without interruption. The first set of image lines have a set number of image lines which is removed from an output side (first in, first out, FIFO) of the line buffer 20 and transmitted to the swath buffer 30. The composition at the output end of the line buffer 20 (shown on the left side of the line buffer 20 in FIG. 2) therefore determines which image lines will be transmitted to the swath buffer 30. The transferring of the first set of image lines from the line buffer 20 to the swath buffer 30 is preferably executed when (preferentially as soon as) the swath buffer 30 is emptied due to a print swath having been printed.

Whenever a swath 42 has been printed, the swath buffer 30 is emptied and immediately re-filled with a number of image lines (if available) from the second set of image lines in the line buffer 20. Preferably, the swath buffer 30 comprises two parts that are used alternately to buffer a swath. Thus, one part of the swath buffer is used for odd-numbered swaths and a second part is used for even-numbered swaths. When printing an odd-numbered swath from the one part of the swath buffer, an even-numbered swath is transmitted from the line buffer 20 to the second part of the swath buffer 30 and vice versa.

"Output side" herein does not refer to a physical position of the physical component providing the line buffer 20, but rather to a side of the stack represented by the line buffer 20 at which image lines will be taken out (and transferred to the swath buffer 30) according to the FIFO principle. Similarly, "input side" refers to a side of the stack at which image lines are fed in (from the image storing module 10) according to the FIFO principle.

One of the key ideas of the present invention is the use of the swath buffer 30, together with how the line buffer 20 is filled, i.e. how the composition of image lines within the line buffer 20 is created.

In FIG. 1, it is shown that the image storage module 10 (e.g. a non-volatile memory bank, or a RAM bank of a computer system) comprises a first bitmap BM1 representing a first image to be printed first, and a second bitmap BM2 representing a second image to be printed thereafter.

Thus, first, image lines from the first bitmap BM1 are fed into the line buffer 20 at an input side of the line buffer 20, shown schematically on the right of the line buffer 20 in FIG. 1. At some point, the printer controller 50 will determine that there are not enough remaining image lines of the first bitmap BM1 to completely fill the line buffer 20. In other words, the printer controller 50 will determine that there are empty data storage sections on the input side of the line buffer 20.

The printer controller 50 will then check whether a pausing signal 81 is active, and/or whether that pausing signal 81 indicates that the printing of the second image should be halted. As has been mentioned before, the pausing signal 81 may be an automatically generated pausing signal 81 in response to a detected abnormality in the roll-fed printing apparatus (e.g. a signal indicating a nozzle failure). Such a pausing signal 81 may be output by an optional abnormality detecting unit 52 of the roll-fed printing apparatus 100 upon detection of an abnormality. Additionally or alternatively, the pausing signal 81 may be generated by a user input, e.g. by pressing a "pause" button of an optional user interface, UI, 54 of the roll-fed printing apparatus 100.

When the line buffer 20 comprises the final image lines of a first bitmap BM1 representing the first image while there are still empty data storage sections within the line buffer 20, and when it is not indicated, by the pausing signal 81, that the printing of the second image should be halted, then starting image lines of the second bitmap BM2 representing the second image are transferred, by the printer controller 50, to the empty data storage sections of the line buffer 20.

This can be done either directly, such that the starting image lines of the second bitmap BM2 are transferred to the empty data storage sections such as to be directly adjacent to the final image lines of the first bitmap BM1, or such that boundary image lines (representing a boundary area on the recording medium 1 between the first and the second image to be printed, as has been discussed above) are arranged directly between the last image lines of the first bitmap BM1 and the starting image lines of the second bitmap BM2.

When the pausing signal indicates that the printing of the second image should be halted, then the transferring of the starting image lines of the second bitmap BM2 (and or of the boundary image lines) may be halted until the pausing signal 81 is changed to indicate that the printing of the second image should no longer be halted, at which point it will be proceeded as described above. The pausing signal 81 may, for example, be changed by the abnormality detection unit 52 upon detecting a termination of the abnormality, or by the UI 54 upon a corresponding user command.

As a result, the first set of image lines transferred to the swath buffer 30 may comprise both image lines of the first bitmap BM1 and of the second bitmap BM2 (and possibly also boundary image lines). In other words, during one and the same swath 42, the print head 40 will then not only finish printing the first image, it will also start printing the starting image lines of the second image, saving valuable time thereby.

According to the foregoing, the method according to the first aspect may, in other words, comprise the steps of:
 a) receiving the first image (or "a first print job") to print;
 b) generating the first bitmap BM1 representing the first image;
 c) transferring image lines from the first bitmap BM1 into the line buffer 20 that comprises a number of image lines (i.e. the second set of image lines) that is to be printed without interruption;
 d) transferring image lines from the line buffer 20 to the swath buffer 30 that comprises (i.e. stores) a number of image lines equal to a width (i.e. the number of image lines) of the print swath 42;
 e) controlling the print head 40 to move in reciprocation in the scanning direction SD and to print the print swath 42 in accordance with the first set of image lines in the swath buffer 30;
and further comprising the steps of:
 f) receiving the second image (or "a second print job") to print;
 g) generating the second bitmap BM2 representing the second image;
wherein, when it is not indicated by the pausing signal 81 that the printing of the second image should be halted, the image lines of the second bitmap BM2 are transferred to the line buffer 20 without waiting until the printing of the first bitmap BM1 is finished.

Advantageously, the steps f) and g) may even be performed after any or all of the steps a)-e) are already under way.

Even more advantages than have been discussed with respect to FIG. 1 are gained when the roll-fed printing apparatus 100 is a UV curable ink printing apparatus as shown schematically in FIG. 2. As has been discussed above, the UV lamp 70 commonly requires a regular step cadence with respect to the recording medium 1. Due to the usually fixed arrangement of the axes of the UV lamp 70 and of the print head 40 with respect to each other (since in roll-fed printing apparatuses usually the recording medium 1 is moved with respect to the print head 40 along the medium transport direction TD and not the other way around), that regular step cadence of the UV lamp 70 usually directly results in a regular step cadence of the print head 40.

In a roll-fed printing apparatus according to, a print head would therefore, having finished printing the last image lines of the first bitmap, have to move further along the recording medium (without printing) simply so that the UV lamp would be able to be moved over the last image lines of the first bitmap. Then, in order to maintain a small distance between the printed first image and the second image to be printed, the recording medium would have to be transported in the reverse direction until the print head is positioned again close to the printed first image.

However, according to the roll-fed printing apparatus 100 and the method described herein, the print head 40 may continue printing as the recording medium 1 is moved under it while the UV lamp 70 continues curing the already applied UV curable ink. Depending on the width of the swaths 42, 72 along the media transport direction TD, the distance between the print head 40 and the UV lamp 70, and the lengths of the first image and the second image along the media transport direction TD, the print head 40 may, while the UV lamp 70 is curing image lines of the first bitmap BM1, print in one swath 42 image lines from both the first bitmap BM1 and the second bitmap BM2 and/or image lines only from the second bitmap BM2, in each case possibly leaving boundary image lines. It is evident that controlling the roll-fed printing apparatus 100 in this way results in considerable time savings compared to the prior art. In a similar way, the invention may be applied in a printing apparatus for printing on large sheets or rigids.

Figure 3:
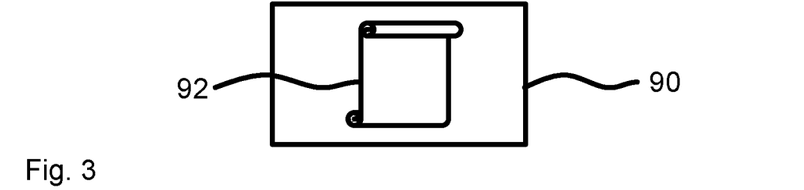
FIG. 3 schematically shows a representation of a software medium according to an embodiment of the second aspect.

FIG. 3 schematically shows a software medium 90 according to an embodiment of the second aspect. The software medium 90 comprises executable code 92 configured to, when executed, perform the method of the first aspect, e.g. as described with respect to either the roll-fed printing apparatus 100 or the method of controlling the roll-fed printing apparatus 100, according to any or all of the FIGS. 1 to 4 and/or according to any of the variants and modifications of the roll-fed printing apparatus 100 and/or of the method described herein.

The software medium may, specifically, be formed as a CD or a CD-ROM, a DVD or a DVD-ROM, a Blu-ray disc or a Blu-ray-ROM disc, a magnetic hard drive, a solid-state disk (SSD) hard drive, a USB memory device and so on.

While detailed embodiments of the present invention are disclosed herein, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. In particular, features presented and described in separate dependent claims may be applied in combination and any advantageous combination of such claims are herewith disclosed.

Further, the terms and phrases used herein are not intended to be limiting; but rather, to provide an understandable description of the invention. The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language).

It will be evident that the described embodiments may be varied in many ways. All such modifications as would be evident to one skilled in the art starting from what is explicitly described are intended to be included.

The invention claimed is:

1. A method for operating a printing apparatus for printing at least a first and a second image on a recording medium in a plurality of swaths, said method comprising the steps of:
 printing each swath by a print head that reciprocates in a scanning direction;
 configuring the print head to apply marking material to the recording medium in accordance with a first set of image lines for each swath to be printed; and
 providing the first set of image lines to the print head from a swath buffer,
 wherein the first set of image lines are transmitted to the swath buffer out of a second set of image lines stored in a line buffer, wherein the second set of image lines in the line buffer is to be printed without interruption,
 wherein the line buffer is fed with image lines of a first bitmap representing the first image and thereafter with image lines of a second bitmap representing the second image, and
 wherein, when the line buffer comprises the final image lines of the first bitmap while there are still empty data storage sections within the line buffer, and when it is not indicated, by a pausing signal, that the printing of the second image should be halted, the starting image lines of the second bitmap are transferred to the empty data storage section of the line buffer.

2. The method according to claim 1, wherein the starting image lines of the second bitmap are transferred to the empty data storage sections within the line buffer such as to be directly adjacent to the final image lines of the first bitmap.

3. The method according to claim 1, wherein, whenever starting image lines of the second bitmap are to be transferred to the empty data storage sections of the line buffer, first a number of boundary image lines representing a boundary area on the recording medium between the first and the second image to be printed is transferred to the line buffer such as to be directly adjacent to the final image lines of the first bitmap, and
 wherein then starting image lines of the second bitmap are transferred to the line buffer such as to be directly adjacent to the boundary image lines.

4. The method according to claim 1, wherein, when the starting image lines of the second bitmap are transferred to the empty data storage section of the line buffer, the number of image lines of the second bitmap that are transferred to the line buffer is the smaller number of the number of lines that fit in the empty data storage section and the number of lines remaining in the second bitmap.

5. The method according to claim 4, wherein, when fewer image lines of the second bitmap are transferred than are needed to fill the line buffer, starting image lines from a third bitmap representing a third image are transferred to the empty data storage section of the line buffer, provided that it is not indicated, by the pausing signal, that the printing of the third image should be halted.

6. The method according to claim 5, wherein the starting image lines from the third bitmap are transferred to the empty data storage sections of the line buffer after a number of boundary image lines representing a boundary area on the recording medium between the second and the third image to be printed are transferred to the line buffer such as to be directly adjacent to the image lines of the second bitmap and the starting image lines of the third bitmap are transferred to the line buffer such as to be directly adjacent to the boundary image lines, wherein the number of boundary image lines is a non-negative integer.

7. The method according to claim 1, wherein, when the number of final image lines of the first bitmap contained in the line buffer is smaller than the number of image lines required for the first set of image lines, then the first set of image lines which is transmitted to the swath buffer, is formed as comprising those final image lines of the first bitmap as well as image lines of the starting image lines of the second bitmap.

8. The method according to claim 1, wherein, when the pausing signal indicates that the printing of the second image should be halted, the transferring of the starting image lines from the second bitmap to the line buffer is delayed or halted.

9. The method according to claim 8, wherein, when the pausing signal, after having indicated that the printing of the second image should be halted, is changed to indicate that the printing of the second image should no longer be halted, the starting image lines of the second bitmap representing the second image are transferred to the empty data storage section of the line buffer.

10. The method according to claim 1, wherein the pausing signal is an automatically generated pausing signal in response to a detected abnormality in the printing apparatus.

11. The method according to claim 1, wherein the pausing signal is generated by a user input.

12. The method according to claim 1, wherein the printing apparatus is a UV curing printing apparatus comprising a UV curing lamp which is controlled to start or continue curing of UV curable ink already applied to the recording medium when the print head is applying UV curable ink to the recording medium in accordance with the first set of image lines in the swath buffer, even when the first set of image lines in the swath buffer comprises both image lines from the first bitmap and the second bitmap and/or even when the first set of image lines consists of image lines only from the second bitmap.

13. A non-transitory software medium comprising executable code, the executable code configured to, when executed, perform the method according to claim 1.

14. A printing apparatus for printing at least a first and a second image on a recording medium in a plurality of swaths, comprising:
 a print head configured to reciprocate in a scanning direction, wherein the print head is further configured to apply marking material to the recording medium in accordance with a first set of image lines for each swath to be printed;
 memory configured to receive and store a first bitmap representing the first image and a second bitmap representing the second image;
 a line buffer;
 a swath buffer; and
 a printer controller,
 wherein the printer controller is configured to perform the method according to claim 1.

15. The printing apparatus of claim 14, wherein the printing apparatus is a UV curing printing apparatus comprising a UV curing lamp and wherein the printer controller is configured to control the UV curing lamp to start or continue curing of UV curable ink already applied to the recording medium when the print head is applying UV curable ink to the recording medium in accordance with the first set of image lines in the swath buffer, even when the first set of image lines in the swath buffer comprises both image lines from the first bitmap and the second bitmap and/or even when the first set of image lines consists of image lines only from the second bitmap.

* * * * *